US009398267B2

(12) United States Patent
Kass

(10) Patent No.: US 9,398,267 B2
(45) Date of Patent: Jul. 19, 2016

(54) BOX-TO-BOX CAMERA CONFIGURATION/RECONFIGURATION

(75) Inventor: Aharon Kass, Herzliya (IL)

(73) Assignee: FLIR Commercial Systems, Inc., Goleta, CA (US)

(*) Notice: Subject to any disclaimer, the term of this patent is extended or adjusted under 35 U.S.C. 154(b) by 1052 days.

(21) Appl. No.: 13/265,089

(22) PCT Filed: Apr. 21, 2010

(86) PCT No.: PCT/IL2010/000318
§ 371 (c)(1),
(2), (4) Date: Jun. 5, 2012

(87) PCT Pub. No.: WO2010/122555
PCT Pub. Date: Oct. 28, 2010

(65) Prior Publication Data
US 2012/0229648 A1 Sep. 13, 2012

(30) Foreign Application Priority Data

Apr. 20, 2009 (IL) .......................................... 198246

(51) Int. Cl.
H04N 7/18 (2006.01)
(52) U.S. Cl.
CPC ............. H04N 7/181 (2013.01); H04N 7/185 (2013.01)
(58) Field of Classification Search
None
See application file for complete search history.

(56) References Cited

U.S. PATENT DOCUMENTS

| 5,659,787 A | 8/1997 | Schieltz |
| 5,974,236 A | 10/1999 | Sherman |
| 2003/0025790 A1* | 2/2003 | Smith ........................... 348/143 |
| 2004/0148518 A1 | 7/2004 | Grundback et al. |
| 2005/0149979 A1* | 7/2005 | Creamer et al. ............... 725/105 |
| 2007/0150565 A1* | 6/2007 | Ayyagari et al. .............. 709/223 |

OTHER PUBLICATIONS

International Search Report for International Application No. PCT/IL10/00318 mailed Sep. 2, 2010.

* cited by examiner

Primary Examiner — Sath V Perungavoor
Assistant Examiner — Janese Duley
(74) Attorney, Agent, or Firm — Haynes and Boone, LLP

(57) ABSTRACT

A system and method of setting configurations for individual encoders and cameras in closed circuit television (CCTV) systems, for example surveillance and security systems comprising a plurality of cameras. One aspect of the disclosed invention is a system for configuring/reconfiguring the settings of remote units in an Internet Protocol (IP) based CCTV system. The system may include a configuration device and a plurality of remotely located units dispersed in a region of interest. The plurality of remotely located units may include one or more groups, each group including units of the same type. Each remote unit in the system may include logic and software for operating its components, as well as communication components allowing transfer of information over a network to and from the configuration device and the other remote units in the system.

7 Claims, 5 Drawing Sheets

BOX-TO-BOX CAMERA CONFIGURATION/RECONFIGURATION

CROSS REFERENCE TO RELATED APPLICATIONS

This application is a National Phase Application of PCT International Application No. PCT/IL2010/000318, entitled "Box-To-Box Camera Configuration/Reconfiguration", International Filing Date Apr. 21, 2010, published on Oct. 28, 2010 as International Publication No. WO 2010/122555, which in turn claims priority from Israel Patent Application No. 198246, filed Apr. 20, 2009, both of which are incorporated herein by reference in their entirety.

FIELD OF THE INVENTION

The invention is related to the field of surveillance and security cameras. In particular the invention relates to a system and method of setting the settings of the individual encoders and cameras in closed circuit television (CCTV) systems comprising a plurality of cameras for surveillance and security.

BACKGROUND OF THE INVENTION

Typical analog CCTV systems for surveillance and security systems, for example those in office buildings, industrial facilities, military bases, schools, commercial malls or airports, are comprised of tens and sometimes hundreds of individual cameras distributed around the facility. Each of these cameras records events that take place within a predefined region of interest and transmits images to a central control station where they are monitored and analyzed.

During the configuration/reconfiguration stage of such a system operating settings for each of the camera must be individually set.

In analog surveillance systems these settings must be entered on location for each of the cameras, which in practice means that the initial installation and configuration stage of the system must be carried out by trained personnel. This combined with the time necessary to individually set the settings for each camera significantly increases the initial cost of the system. After the initial configuration of the system occasional updates in the settings of some or all of the cameras have to be made. In prior art systems this means that a technician must be sent to the location of each camera in order to make the required changes increasing the maintenance and operating cost of the system.

An improvement on the analog systems described above is achieved by basing the CCTV system on Internet Protocol (IP) technology that enables configuration/reconfiguration to be done over an IP network directly from the central control station. In prior art IP based CCTV systems the initial configuration and later reconfiguration of the settings of the cameras is still a relatively time consuming task since the IP configuration system is installed in the central control station and each camera must be individually addressed and programmed. In addition the setup process is prone to errors as a result of the repetitive work of having to access each of the cameras in the system separately and manually inserting the data using the input device, e.g. keyboard, at the control station.

It is therefore an object of the present invention to provide a method and system for simplifying the configuration/reconfiguration of the settings in CCTV surveillance and security systems.

It is another object of the present invention to provide a method and system that reduces the number of errors and provides increased integrity of the data during the process of configuring/reconfiguring the settings in CCTV surveillance and security systems.

Further purposes and advantages of this invention will appear as the description proceeds.

SUMMARY OF THE INVENTION

In a first aspect the invention is a system for configuring/reconfiguring the settings of the remote units in an Internet Protocol (IP) based Closed Circuit Television (CCTV) system. The system comprises a configuration device and a plurality of remotely located units that are dispersed in a region of interest. The plurality of remotely located units is comprised of one or more groups, each group comprised of units of the same type. Each of the remote units in the system comprises logic and software for operating its components as well as communication components allowing transfer of information over a network to and from the configuration device and the other remote units in the system.

The system of the invention is characterized in that: each of the remote units comprises all of the logic and software necessary to configure/reconfigure itself and each of the other units in its group; each group contains one arbitrarily selected master unit, whose settings are manually configured/reconfigured by the user of the system using the configuration device; units selected by the user from the remainder of the units in the group are automatically configured/reconfigured from the master unit, which automatically transmits settings, which are selected by the user, to the selected units; and the selected settings are automatically copied to the selected units. Thereby the selected units are configured/reconfigured without the active intervention of the user or the use of the configuration device.

Each of the remote units can comprise either an IP video surveillance camera or it can comprise an analog video surveillance camera and an encoder.

The configuration device comprises an internet browser, a display component, and input and output means.

In embodiments of the invention, the user can select one or more of the following settings to be configured/reconfigured:
 (a) Date & Time Settings;
 (b) Users accounts;
 (c) Dynamic Host Configuration Protocol (DHCP) mode;
 (d) Subnet mask;
 (e) Default gateway address;
 (f) DNS Server address;
 (g) On Screen Display (OSD) settings; and
 (h) Video Streaming parameter settings.

In a second aspect the invention is a method for configuring/reconfiguring the settings of the units in the Internet Protocol (IP) based Closed Circuit Television (CCTV) system the first aspect. The method comprises the following steps:
 (a) the user of the system selects one of the remote units from a group of remote units of the same type to be the master unit;
 (b) the user uses the internet browser on the configuration device to address the master unit;
 (c) the user manually inputs the settings of the master unit using a Graphic User Interface (GUI) transmitted over the network from the master unit and displayed on a display component of the configuration device;
 (d) the user selects the "copy settings" menu of the GUI;
 (e) the software/logic in the master unit identifies all other units in the system;

(f) the user uses the "copy settings" menu to select the settings of the master unit to be copied to the other units of the same type;

(g) the user uses the "copy settings" menu to select the units of the same type to which the settings selected in step (f) are to be copied;

(h) the software/logic in the master unit transmits the settings selected in step (f) to the units selected in step (g) and the software/logic in each of the selected units copies the settings selected in step (f) into the selected units;

(i) the system notifies the user of the progress and results of the copying in step (h); and (j) steps (a) to (i) are repeated for the remaining types of remote units.

According to an embodiment of the method of the invention the user can select one or more of the following settings to be configured/reconfigured:

(a) Date & Time Settings;
(b) Users accounts;
(c) Dynamic Host Configuration Protocol (DHCP) mode;
(d) Subnet mask;
(e) Default gateway address;
(f) DNS Server address;
(g) On Screen Display (OSD) settings; and
(h) Video Streaming parameter settings.

According to an embodiment of the method of the invention if the copying to one or more of the remote units has failed then the user can select one of the following options:

(a) to retry to copy the settings from the master unit to the remote units which failed to be configured;
(b) to go out of the copy menu and manually individually configure each of the remote units for which the copying failed using the configuration device; and
(c) to do nothing.

All the above and other characteristics and advantages of the invention will be further understood through the following illustrative and non-limitative description of preferred embodiments thereof, with reference to the appended drawings. In the drawings the same numerals are sometimes used to indicate the same elements in different drawings.

DETAILED DESCRIPTION OF PREFERRED EMBODIMENTS

There are two basic embodiments of Internet Protocol (IP) based Closed Circuit Television (CCTV) systems (IPCCTV). In the first embodiment, which is shown schematically for a prior art IPCCTV system in FIG. 1A and for the system of the invention in FIG. 2A, respectively, the video cameras $18_1$ to $18_n$ and $28_1$ to $28_n$ are analog cameras. In this case the remote units $14_1$ to $14_n$ and $24_1$ to $24_n$ include a video encoder $16_1$ to $16_n$ and $26_1$ to $26_n$ that contains the software necessary to convert the analog camera to an IP camera as well as communication components allowing transfer of information to and from the remote unit over the network. In the second embodiment, shown schematically for a prior art IPCCTV system in FIG. 1B and for the system of the invention in FIG. 2B respectively, the video cameras $18'_1$ to $18'_n$ and $28'_1$ to $28'_n$ are IP cameras, which contain all the necessary software and as well as communication components allowing transfer of information to and from the camera over the network. Therefore there is no need for an encoder in the remote unit $14'_1$ to $14'_n$ and $24'_1$ to $24'_n$ which comprises the camera $18'_1$ to $18'_n$ and $28'_1$ to $28'_n$ only.

In both embodiments of the prior art system and also the system of the invention, the network can be any type of network known in the art, e.g. WAN, LAN, wireless, and cellular. The cameras can be the same type or of different types known in the art, e.g. simple cameras having fixed focal length and field of view mounted such that they always point in given direction, similar cameras mounted such that a reversible motor causes them to continuously scan a field of view larger than that of the camera, and cameras mounted on a mechanism comprising motors that allow the viewing angle and/or zoom to be changed on instruction from the user or system, periodically, or continuously thereby providing advanced PTZ (Pan, Tilt, and Zoom) and, if provided with appropriate software, tracking ability. In general each different type of IP camera will be configured differently and each of the different types of analog camera will require a different type of encoder.

Herein, the term "settings" is used to refer to settings of both the encoders and analog cameras of the first embodiment and the settings of the IP cameras of the second embodiment. Furthermore herein the term "settings" is used to refer to both settings that are "camera settings", e.g. frame rate, and to "internet settings", e.g. IP address of the time server.

Figure 1A:
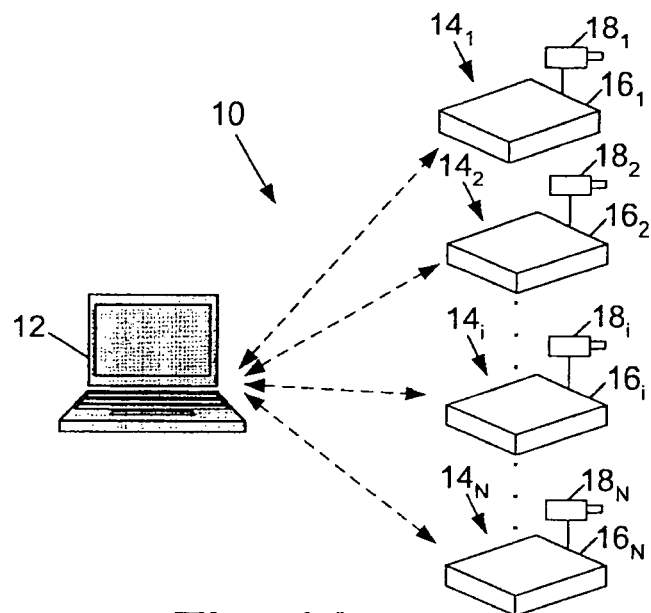
FIG. 1A and FIG. 1B schematically show the configuration/reconfiguration process for a prior art IP based CCTV system.
Figure 1B:
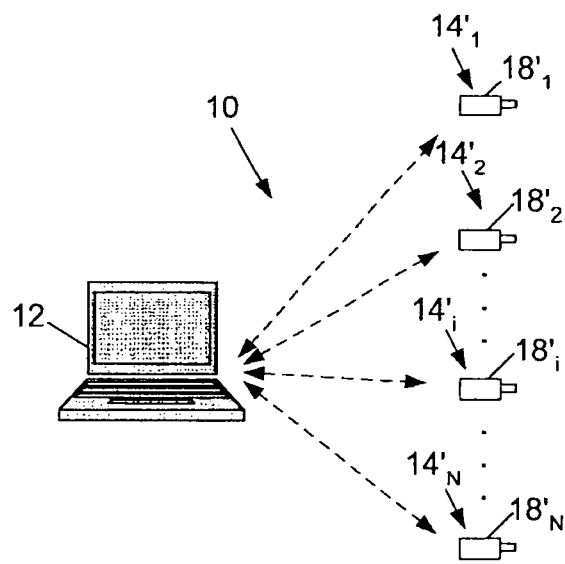

FIG. 1A and FIG. 1B schematically show the configuration/reconfiguration process for a prior art IPCCTV system. The system comprises a control center 12 and a plurality of remotely located units $14_1$ to $14_n$ (or $14'_1$ to $14'_n$) that are dispersed in the region of interest. Configuration/reconfiguration of each remotely located unit $14_i$ is done from control center 12 using any internet browser, setup software located in the computer of control station 12, and conventional input and output means such as a keyboard and computer mouse. After the configuration/reconfiguration has been performed using the computer of control station 12, each unit $14_i$ is a completely self sustained device that transmits video images and/or other information regarding events that take place in the field of view of its camera to pre-selected IP addresses, according to the configuration/reconfiguration instructions that have been installed in the remote unit. During the configuration/reconfiguration stage of a prior art IPCCTV system each remotely located unit $14_i$ must be individually addressed and its settings manually input from the control center 12.

Figure 2A:
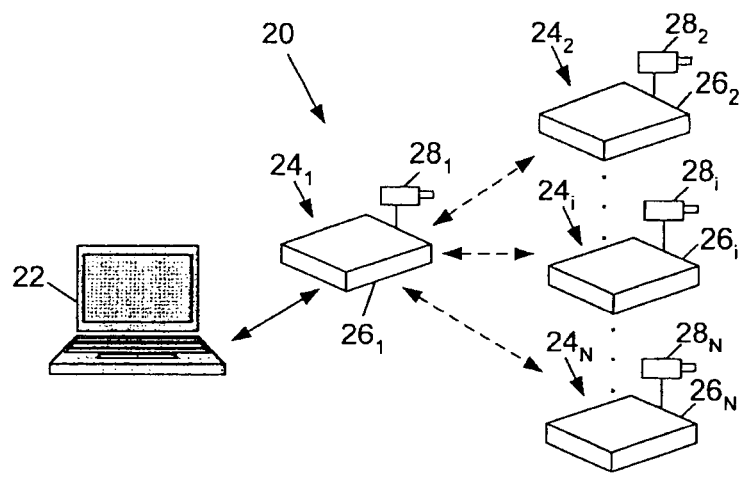
FIG. 2A and FIG. 2B schematically show the configuration/reconfiguration process for an IP based CCTV system according to the present invention.
Figure 2B:
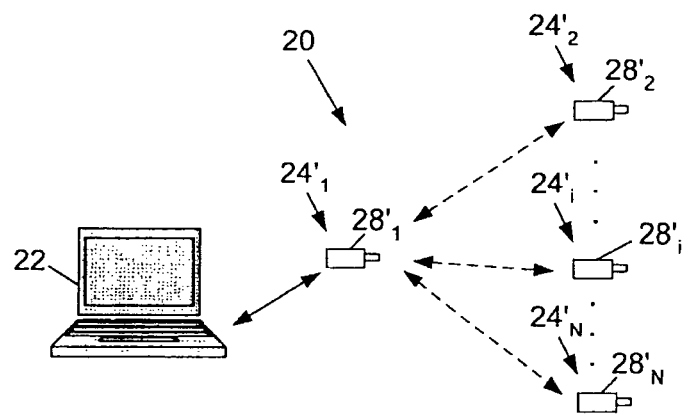

FIG. 2A and FIG. 2B schematically show the configuration/reconfiguration process for an IPCCTV system 20 according to the present invention. The system of the invention comprises a configuration device 22 and a plurality of remote units $24_1$ to $24_n$ (or $24'_1$ to $24'_n$) that are dispersed in the region of interest. In principle, configuration device 22 can be located any place in the world and can be any type of device, e.g. a personal computer, a hand-held personal digital assistant, or a cell phone, that is equipped with an internet browser and display and input and output means such as a keyboard and computer mouse. Aside from the internet browser, configuration device 22 comprises none of the software necessary to configure/reconfigure the remote units $24_i$. All of the logic and software necessary to perform the method of the invention, e.g. to setup units, to locate others units, and to copy settings, is located on each of the remote units, each of which is capable of two way communications over the network with configuration device 22 and with each of the other remote units either separately or in groups as will be explained herein below.

According to the method of the invention, during the configuration/reconfiguration stage, the system user selects any one of the remote units, e.g. unit $24_1$, which will be known as the (virtual) master unit. The user uses the browser of configuration device 22 to contact the IP address of the master unit. When contact has been established the software in the master unit displays a dedicated Graphical User Interface (GUI) on the display of configuration device 22 that is used to guide the user through the process of configuring the master unit. In embodiments of the invention the GUI is displayed on a touch screen that simplifies the input of instructions to the system. Once the master unit has been configured/reconfigured selected (or all) of the settings of the master unit can be automatically copied to all other remote units, known as slave units, of the same type in the system, thereby configuring/reconfiguring the cameras of the slave units without active intervention of the user of system 20 or the use of configuration device 22.

Figure 3:
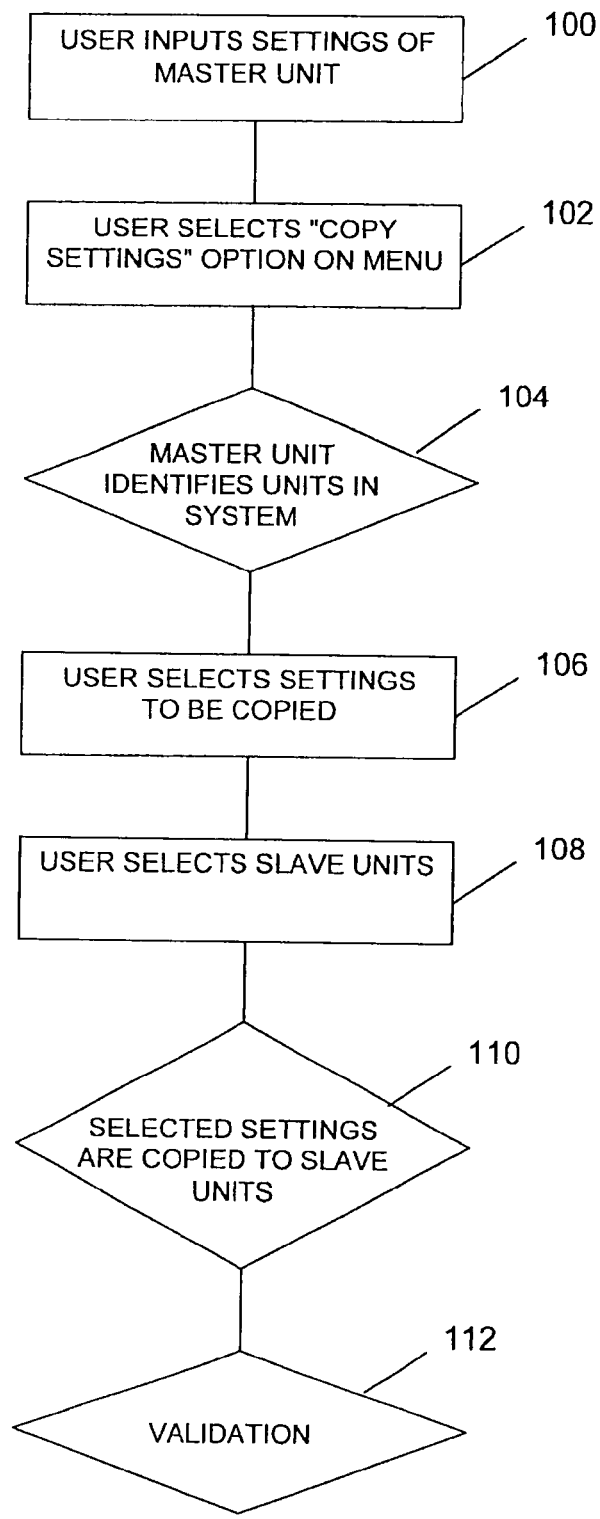
FIG. 3 is a flow chart showing the workflow of the configuration/reconfiguration process using the IP based CCTV system of the invention.

FIG. 3 is a flow chart showing the workflow of the configuration/reconfiguration process using IPCCTV system 20 of the invention. In step 100 the user uses the internet browser of configuration device 22 to address remote unit $24_1$, which has been chosen to be the master unit and to configure its settings. It is emphasized that the choice of remote unit $24_1$ to be the master unit is arbitrary and any of the other remote units could have been selected.

Figure 4:
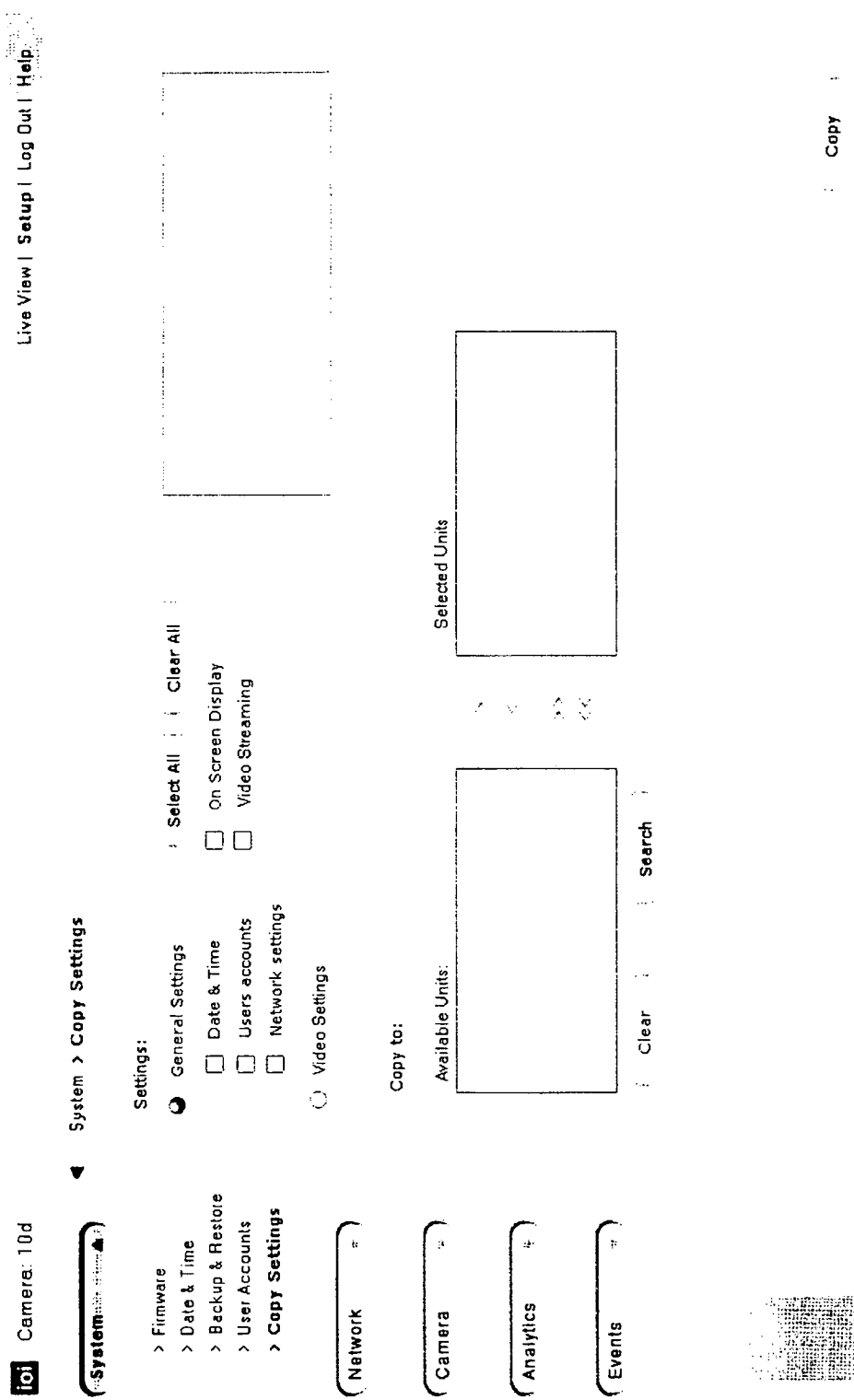
FIG. 4 is a screen shot showing an embodiment of the "Copy Settings" menu.

After the internet browser makes contact with master unit $24_1$ and the settings of the master unit have been configured, the user, in step 102, selects the "Copy Settings" menu on the GUI that is downloaded from master unit $24_1$ onto the display of configuration device 22. FIG. 4 is a screen shot showing an embodiment of this menu. Each of the units $24_i$ comprises unit specific information, such as its type and IP configuration, burned-in. Once the copy settings menu is selected, master unit $24_1$ automatically searches around the network and identifies all of the other remote units in the system (step 104). It is to be noted that although the result of searching for units in step 104 will be a list all available units in the system, regardless of the unit type, the settings can be changed only for slave units whose type is the same as that of the master unit. Therefore, although all units that have been found are listed on the screen, slave units with versions different from that of the master unit will be "grayed out" and cannot be selected. Once the procedure outlined in FIG. 3 is completed, a new master unit is selected from amongst the "grayed out" units and the procedure is repeated until all of the units in system 20 have been configured/reconfigured. One consequence of this is that systems comprised of remote units comprising different types will require different GUI screens for each type of camera.

The user then (step 106) uses the GUI to select the settings of the master unit that he wishes to copy to the slave units. Using the embodiment of the GUI shown in FIG. 4, the user can select the following settings:

(a) Date & Time Settings;
(b) Users accounts;
(c) System (network) settings, including:
 i. Dynamic Host Configuration Protocol (DHCP) mode, which, if selected, will make all units work in DHCP mode, only if the local unit works in DHCP mode otherwise the specific IP address shall not be copied;
 ii. Subnet mask;
 iii. Default gateway address; and
 iv. DNS Server address;
(d) On Screen Display (OSD) settings; and
(e) Video Streaming parameter settings.

It is stressed that the GUI shown in FIG. 4 is presented to illustrate the invention and that other embodiments, tailored to specific applications, that will allow some, all, or different settings to be selected by the user can easily be designed.

In the next step (step 108) the user selects the slave units that he wishes to configure/reconfigure.

After the user selects the topics to be copied (step 106) and the slave units to which he wants to copy the settings (step 108), the master unit transmits the selected topics to each of the selected slave units where the settings are copied, thereby configuring/reconfiguring the selected slave units (step 110).

It is to be noted that, in contrast to prior art systems, copying is done on the network directly from the master unit to the slave unit without any input from or being routed through the configuration device. An additional difference between the invention and the prior art is that instead of repeating the process of manually sending the settings to each remote unit, the method of the invention requires the user to input the settings for all units of the same type only once. By entering or changing one or more settings on one unit the results can be immediately seen and the user can verify that he has not made any error. Once the result of configuring/reconfiguring the master unit has been verified, the system itself automatically copies the settings from the master unit into the slave units, thereby eliminating human error and greatly increasing the integrity of the data transfer.

Figure 5:
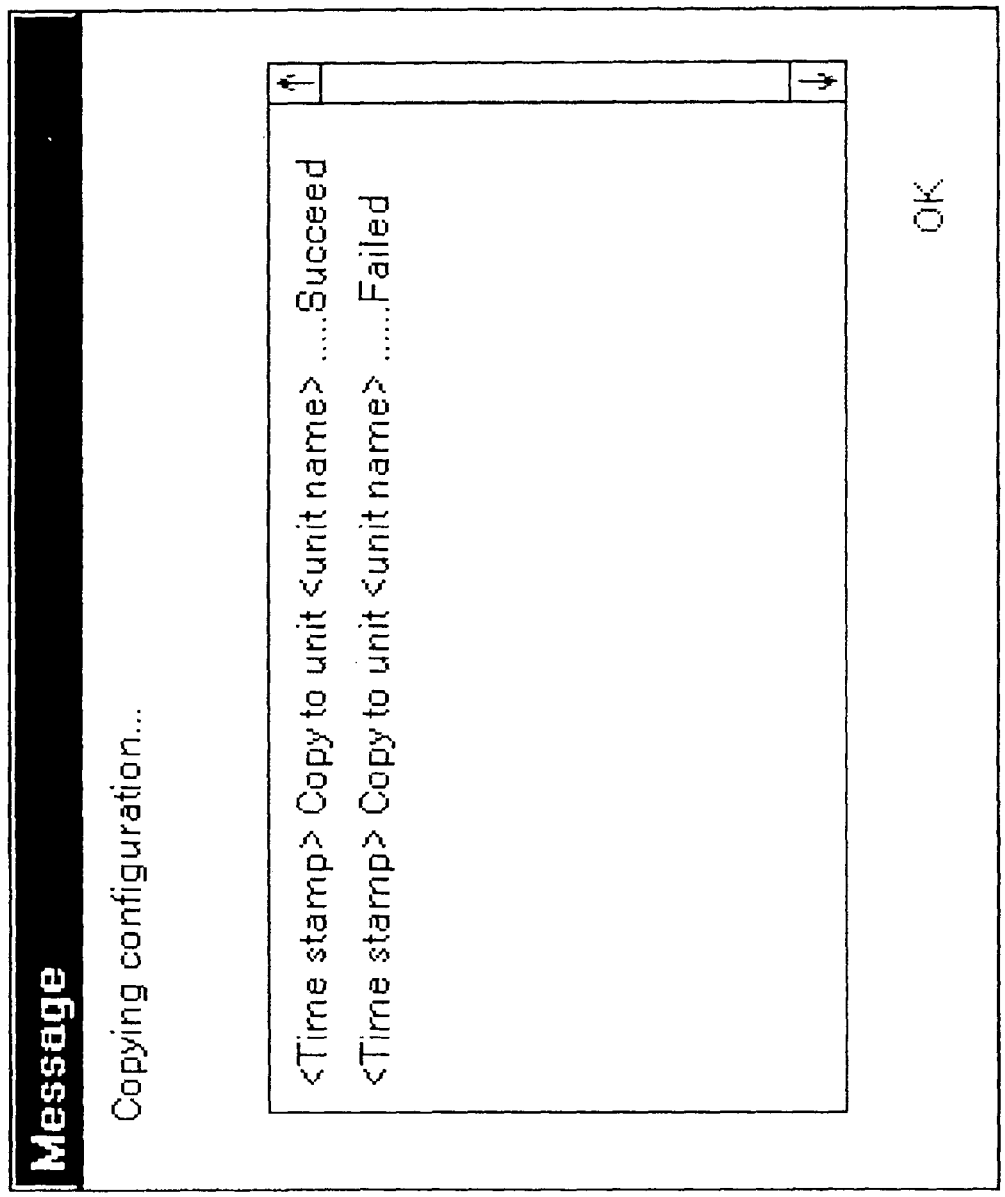
FIG. 5 is a screen shot showing an embodiment of a screen that pops up on the display device of the control station to notify the user of progress and results of the configuration/reconfiguration.

In a final step 112 the system validates that the settings have been successfully copied to the target units. FIG. 5 is a screen shot showing an embodiment of a screen that pops up on the display device of the control station to notify the user of progress and results of the configuration/reconfiguration of the settings of the target units after the "copy" button on the GUI shown in FIG. 4 is pressed. If a message appears on the screen that the copying to one or more of the slave units has failed then the user of the system has several options: (1) To retry to copy the settings from the master unit to the slave units which failed to be configured, i.e. to repeat the same process. (2) To go out of the copy menu and manually configure each of the slave units for which the copying failed individually using the configuration device 22. (3) To do nothing and these units will either continue to function using their original settings or will not function properly and will no longer transmit images.

Although embodiments of the invention have been described by way of illustration, it will be understood that the invention may be carried out with many variations, modifications, and adaptations, without exceeding the scope of the claims.

The invention claimed is:

1. An Internet Protocol (IP) based Closed Circuit Television (CCTV) system comprising a group of remote units of the same type, wherein each of the remote units in the group includes:

a security camera, and communication components for communicating, over a network, with a configuration device and with other remote units in the group;

wherein each of the remote units is adapted to, during a configuration or a reconfiguration of the system:

be selected as a master unit;

identify all other remote units in the group;

receive settings from the configuration device; and automatically copy the settings to the identified remote units;

wherein remote units, selected by a user from the group, are automatically configured/reconfigured by the master unit and wherein the master unit is configured to automatically copy settings selected by the user to the selected remote units.

2. The system of claim 1, wherein each of the remote units comprises either an IP video surveillance camera or an analog video surveillance camera and an encoder.

3. The system of claim 1, wherein the configuration device comprises an internet browser, a display component, and input and output means.

4. The system of claim 1, wherein a user can select one or more of the following settings to be configured/reconfigured:
 (a) Date & Time Settings;
 (b) Users accounts;
 (c) Dynamic Host Configuration Protocol (DHCP) mode;
 (d) Subnet mask;
 (e) Default gateway address;
 (f) DNS Server address;
 (g) On Screen Display (OSD) settings; and
 (h) Video Streaming parameter settings.

5. A method for configuring/reconfiguring the settings of the units in an Internet Protocol (IP) based Closed Circuit Television (CCTV) system of claim 1, said method comprising the following steps:
 (a) the user of said system selects one of the remote units from a group of remote units of the same type to be the master unit;
 (b) said user uses the internet browser on the configuration device to address said master unit;
 (c) said user manually inputs the settings of said master unit using a Graphic User Interface (GUI) transmitted over the network from said master unit and displayed on a display component of said configuration device;
 (d) said user selects the "copy settings" menu of said GUI;
 (e) the software/logic in said master unit identifies all other units in said system;
 (f) said user uses said "copy settings" menu to select the settings of said master unit to be copied to the other units of the same type;
 (g) said user uses said "copy settings" menu to select which of the units of the same type to which said settings selected in step (f) are to be copied;
 (h) said software/logic in said master unit transmits said settings selected in step (f) to said units selected in step (g) and the software/logic in each of said selected units copies said settings selected in step (f) into said selected units;
 (i) said system notifies the user of the progress and results of the copying in step (h); and
 (j) steps (a) to (i) are repeated for the remaining types of remote units.

6. The method of claim 5, wherein the user can select one or more of the following settings to be configured/reconfigured:
 (a) Date & Time Settings;
 (b) Users accounts;
 (c) Dynamic Host Configuration Protocol (DHCP) mode;
 (d) Subnet mask;
 (e) Default gateway address;
 (f) DNS Server address;
 (g) On Screen Display (OSD) settings; and
 (h) Video Streaming parameter settings.

7. The method of claim 5, wherein if the copying to one or more of the remote units has failed then the user can select one of the following options:
 (a) to retry to copy the settings from the master unit to the remote units which failed to be configured;
 (b) to go out of the copy menu and manually individually configure each of said remote units for which the copying failed using the configuration device; and
 (c) to do nothing.

* * * * *